United States Patent [19]

Zsagar

[11] 3,997,912
[45] Dec. 14, 1976

[54] METHOD AND APPARATUS FOR AUTOMATIC PATTERNING CORRECTION

[75] Inventor: Hans-Joachim Zsagar, Karlsruhe, Germany

[73] Assignee: Firma Sulzer Morat GmbH, Bonlanden, Germany

[22] Filed: July 25, 1975

[21] Appl. No.: 600,514

[30] Foreign Application Priority Data

July 26, 1974 Germany ..................... 2435982

[52] U.S. Cl. ..................... 358/78; 178/DIG. 22
[51] Int. Cl.² .................................... H04N 9/04
[58] Field of Search ................... 358/78, 80; 178/DIG. 22; 356/173, 176, 178; 112/79 A; 139/319; 250/226; 340/146.3 B; 66/154 A

[56] References Cited

UNITED STATES PATENTS

| | | | |
|---|---|---|---|
| 3,578,976 | 5/1971 | Schunack | 250/226 |
| 3,814,932 | 6/1974 | Anati et al. | 356/176 |
| 3,823,257 | 7/1974 | Oelmayer et al. | 358/78 |

Primary Examiner—John C. Martin

[57] ABSTRACT

Method and apparatus for processing items of information relating to color of small areas obtained when scanning a multicolored pattern and for correcting same when the color of such small areas is not clearly identifiable because more than one color is present in such small areas.

25 Claims, 26 Drawing Figures

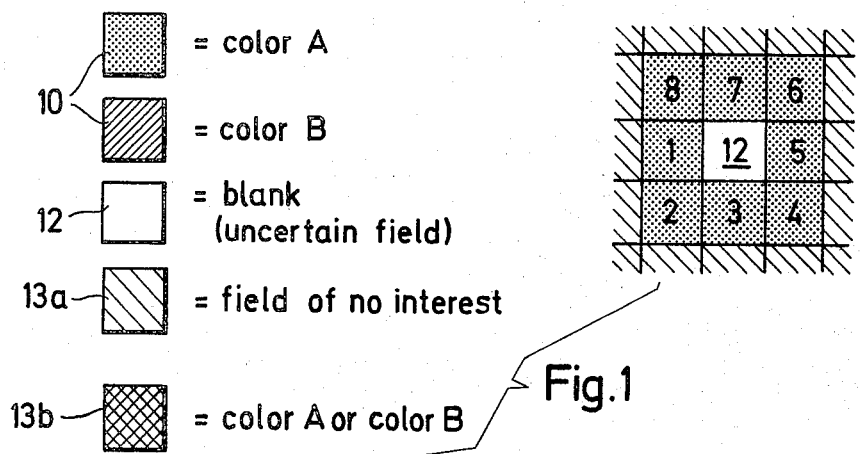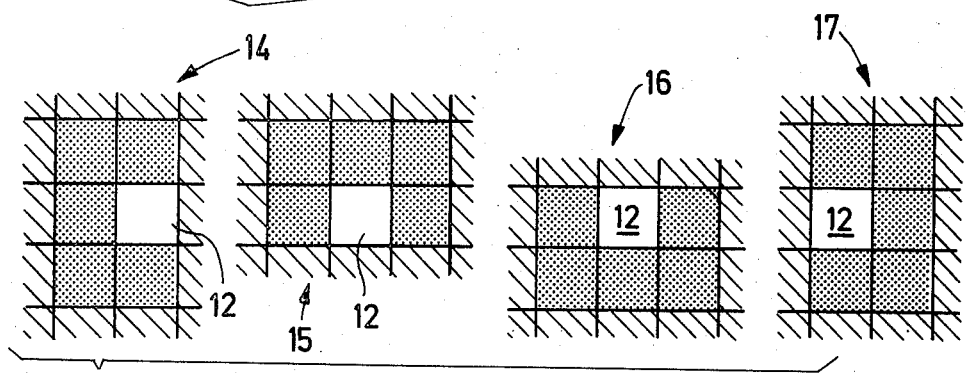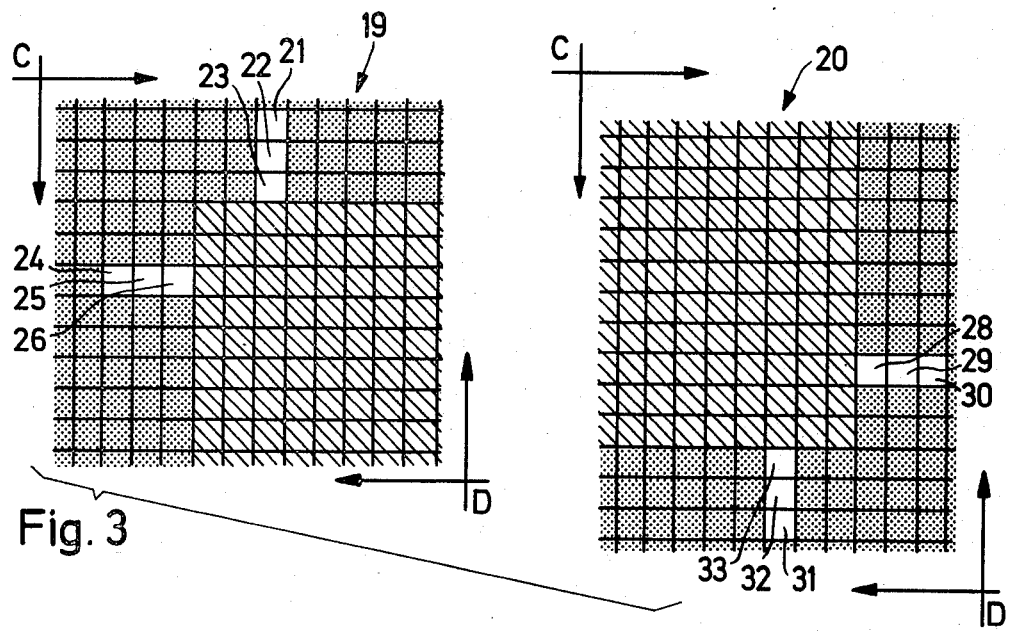

METHOD AND APPARATUS FOR AUTOMATIC PATTERNING CORRECTION

If a multicolored pattern, for example in the form of a sketch or a drawing by an artist, is to be reproduced by an automatically operating machine, it will normally become necessary, to arrange the pattern in screen form with the aid of manual, semi-automatic or automatic systems, that is to subdivide the pattern into separate fields, arranged in rows and columns, to ascribe to each field of the pattern one specific color, of several possible, and to derive from the colors of the individual fields drive signals, suitable for the control of the machine.

The generation of flawless drive signals will meet with substantial difficulties. While the application of manual systems is very assiduous and time consuming, the automatic systems will require the use of opto-electronic scanning devices which make possible a step-by-step scanning of the pattern and the assignment of one specific color to each field being scanned. If one field being scanned does not have a clearly recognizable color, due for example to inexact drawing, chipped off color particles, or to the fact that two or more colors are adjacent to each other within this one field with no single color being preponderant, it will become necessary to force a decision in favor of one of the possible colors because it is imperative to supply the machine reproducing the pattern, with a drive signal for this specific field. This will lead frequently to erroneous decisions, causing evident defects in the reproduction of the pattern. This is one of the primary reasons why heretofore semi-automatic systems have been employed exclusively, using automatic scanning and screening, but manual corrections. Therefore, there is a need for a method and for practical devices which make feasible an automation of the correcting operation also. Automatic corrections have been known heretofore only in connection with black and white representation of alphanumeric characters. They are based on the principle that during the scanning and screening there is assigned, regardless of potential errors, the color "white" or "black" to each individual field of the pattern, for example in the form of logic 0 data or logic 1 data, and that subsequently and automatically any 0 data is changed to a 1 data, or vice versa, whenever an assignment is found to be in error. The conversion from white fields of the pattern to black fields can be necessary for example if one continuous line of character is broken because of poor writing quality. Inversely, a black field of the pattern would require a conversion to a white field if it extends outside the character, caused by a scanning error.

The automatic correction of the pattern is accomplished in case of known processes in such manner that all informations, obtained through scanning and screening, are transferred to a storage, for example the memory of a computer, and are then processed in sequence by a "matrix" which is a testing technique, examining the informations of fields, adjacent to the field being tested, relative to the presence of specific characteristics. If specific characteristics are present, requiring in many cases the need for correction of the information being processed, such information will be converted automatically to the other (0 data or 1 data respectively) information. It becomes possible to accomplish in this manner a great number of proper corrections.

The above described method is not suitable for the correction of multicolor patterns for two important reasons. First, there are usually more than two colors present in case of such patterns. Therefore, if an error is found by use of a matrix, it will not be possible to replace simply one color which is present by the other color, not present. Furthermore, it would be very cumbersome and time-consuming, to process each individual field of the pattern by the use of at least two matrixes in order to determine any possible errors, and to correct then such errors based on a detailed specification, because multicolored patterns of the type discussed here could involve several millions of pattern fields.

It is the purpose of the invention, to establish a method for the correction of information obtained from the scanning of a multicolored pattern which will permit to a large extent an automation of such corrections. One specific aim of the invention is the establishment, based on known methods and devices concerned with the correction of black and white alpha-numeric symbols, of new methods and devices which are suitable for the correction of information obtained from multicolored patterns, and which will result in patterns arranged in screen form and are acceptable by a viewer.

The method proposed by the invention for the processing of information obtained from the scanning of a multicolored pattern has the characteristics that each individual information, obtained by the scanning of a pattern field with a clearly identifiable color, is represented as color information, and an information, obtained by the scanning of a pattern field with a color not clearly identifiable, is represented as uncertain information, that each individual uncertain information is processed by means of at least one correction matrix, whereby informations from fields near the field associated with the uncertain information are tested to determine whether certain conditions are met, and that the uncertain information is replaced by a color information, determined by the correction matrix, if such conditions are met.

The invention is based on the idea that, in contrast to the corrections of black and white patterns, a systematic and rapid correction of multicolored patterns will be possible only if there is first assigned an uncertain information (label) to all pattern fields having an indefinite, not clearly identifiable color. The generation of uncertain informations is known per se (see U.S. Pat. Nos. 3,578,897 and 3,823,257). However, the uncertain informations, as used by the known methods, serve the purpose to avoid, in case of corrections, the erasing of pattern fields which already exist in the form of spots, printed in color, or in the form of markings on film or paper tape and which are difficult to erase, while the uncertain information, as used by the invention, serves the purpose of designating any information to be processed by means of correction matrixes in a manner also suitable for automatic processing methods.

One of the substantial advantages of this invention is due to the fact that during the correcting operation only those informations need to be processed by means of a correction matrix which originate from a field with an uncertain color, thus reducing substantially the number of processing steps required. There is the additional advantage that the context of the pattern is taken into consideration in each case of correction based on objective aspects, so that the corrections need not be rechecked by an expert with the aim of attaining an optimum, but still subjective, appearance, a practice followed heretofore in case of manual corrections. Finally, if the method proposed by this invention is used in practice and automated with the aid of a computer, the processing will be speeded up substantially in comparison with manual corrections, and the monotonous labor of correcting information is eliminated.

A preferred further development of the invention provides that color information, obtained from fields having a clearly identifiable but, in view of the pattern context, prohibited color, is converted to uncertain information prior to the use correction matrixes. It will thus become possible to correct automatically such fields not originally identified during scanning as containing uncertain information.

An apparatus in accordance with the invention for the practical application of the above described method is characterized by a pattern storage which can store all information obtained through the scanning of a pattern, the information comprising color information obtained through the scanning of fields with a clearly identifiable color and uncertain information, obtained through the scanning of fields having colors that are not readily identifiable, further by a device, connected with the pattern storage, to pick out the uncertain information, further by an address storage to store the address of at least one found uncertain information, further by at least one matrix processor, connected with the pattern storage, for testing information assigned to fields which are near the specific field the address which is stored in the address storage, and by a correction circuit, connected with the matrix processor and the pattern storage, for the conversion of uncertain information into a color information, whereby the matrix processor upon the conclusion of the testing transmits either a correction signal to the correction circuit so as to carry out the conversion, or an error signal to the system to pick out a new uncertain information.

Additional advantageous features of the invention, which are particularly useful for the processing of patterns from which are to be derived signals for the electronic control of a knitting machine or a machine for the production of mosaic images, are described hereinafter.

The invention is described below in detail by use of practical examples and with reference to the accompanying drawings, in which:

FIG. 1 shows the symbols employed in FIGS. 2 to 9;

FIG. 2 depicts U-forming correction matrixes;

FIG. 3 shows examples of the operational use of the matrix depicted in FIG. 2;

Figure 4A:
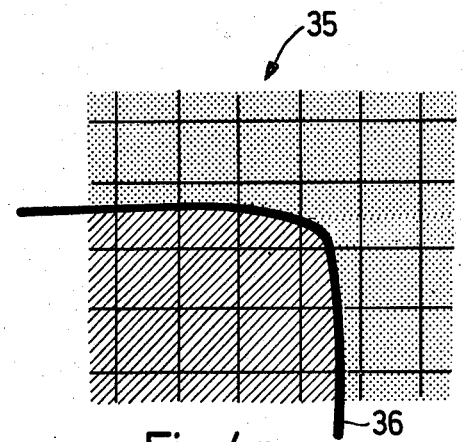
FIG. 4a, 4b, 4c, 5a, 5b, 6, 7a, 7b, 8a, 8b, 9a, 9b and 9c show various and different correction matrixes.

The invention is based on the idea that each field of a multicolored pattern either contains a color which is clearly recognizable upon viewing or scanning, or is displayed in a form which will not permit an immediate and clear decision as to the color which must be present in the field after the screening. In the first case, a color information, corresponding to the recognized color, is assigned to the field, while in the second case an uncertain information will be assigned. If the pattern is scanned by means of opto-electronic scanning devices, the color information can be represented, for example, by binary coded signals in the form of 11, 01 or 10, and the uncertain information, for example, by signals coded 00. If the scanning is accomplished by service personnel, the color and the uncertain information can be transformed immediately into a screened picture, with the uncertain information being shown by blocks without color.

FIG. 1 shows the symbols used hereinafter. Fields 10, which have a clearly recognizable color A or B respectively, are displayed by dotting or by crosshatching to the right, uncertain fields 12 remain blank, and fields 13a, where the color is of no interest in a specific case, are crosshatched to the left. Fields 13b, which may have color A or color B respectively, are crosshatched to the left and to the right. On the right side of FIG. 1 there is shown a section of the pattern, consisting of nine fields, with the center field being an uncertain field 12, while the adjacent fields have the color A. The adjacent fields are identified counterclock-wise by the numerals 1 to 8. The other outer fields are crosshatched to the left, to indicate that these fields are not being considered.

Therefore, each uncertain field 12 of a pattern, unless it is located at the edge of the pattern, with no repetition of the pattern extending beyond, is surrounded by eight adjacent fields 1 to 8 which in many instances will permit a statement as to the proper color of the uncertain field. For example, if all fields 1 to 8, as shown by FIG. 1, have the color A, it would indicate, in the great majority of all cases, that the uncertain field 12 must have the color A. Therefore, it would be possible to carry out one correction of the pattern by providing all uncertain fields 12, which are surrounded by eight adjacent fields of identical color, in the manner shown by FIG. 1, with this color also.

The detailed specification, on the basis of which it will be possible to carry out such correction, is called a "matrix." In FIG. 1 the matrix would demand a correction if all eight fields 1 to 8 adjacent to the uncertain field 12 carry the same color information, and would further demand that, under the conditions existing, the uncertain information, assigned to the uncertain field 12, be replaced by a color information corresponding to the color of the adjacent fields. Therefore, the matrix first determines the conditions to be met by the fields adjacent to an uncertain field, and secondly it specifies the type of correction of the uncertain information which is to be made if the required conditions are met. Since these matrixes allow corrections to be made on the basis of objective aspects, they will be particularly suitable for use in automatic correction systems.

FIG. 2 depicts four U-shaped matrixes 14 to 17 which differ only by their spatial arrangement. The specific conditions required by the U-matrix 14 are met, if all adjacent fields 7, 8, 1, 2 and 3 (in accordance with the showing in FIG. 1), which surround the uncertain field 12 in U-form, possess the same color information. The U-matrix 15 requires this correlation for the adjacent fields 5, 6, 7, 8 and 1, the U-matrix 16 for the adjacent fields 1 to 5, and the U-matrix 17 for the adjacent fields 3 to 7. All four correction matrixes 14 to 17 demand further, that the color information of the adjacent fields, that is color A in the example shown is assigned to the uncertain field 12, if the conditions required by the matrix are met. Preferably, all four U-matrixes are utilized successively for each uncertain information found.

The effectiveness of the U-matrixes 14 to 17 is influenced by the order in which they are applied. To demonstrate this point, there are shown in FIG. 3 two patterns 19 and 20, pattern 19 possessing six uncertain fields 21 to 26, and pattern 20 six uncertain fields 28 to 33. By applying U-matrix 14 to the pattern 19 in direction of arrows C (point by point from left to right, and line by line from top to bottom), only the uncertain information of fields 24 to 26 will be recognized and eliminated, because the conditions required by U-matrix 14 are not met when the matrix is applied to the uncertain information of fields 21 to 23. Upon processing the uncertain information of field 24, the color A is assigned to this field because the required conditions are met. Upon the subsequent processing of the uncertain information of fields 25 and 26, the conditions are likewise met because the uncertain information of fields 24 and 25 respectively had been corrected by each preceding processing step. Correspondingly, the uncertain information of fields 21 to 23 are corrected by U-matrix 15.

When U-matrixes 14 and 15 are applied to the pattern 20, it will not be possible to assign a color to any one of the uncertain fields 28 to 33, but the application of U-matrixes 16 and 17 in the direction indicated by arrows C will lead to the correction of the uncertain information of fields 31 and 30 respectively because uncertain field 31 meets the requirements of matrix 16, and uncertain field 30 meets the requirements matrix 17 is applied. A complete correction can be attained if, by additional processing steps, U-matrixes 16 and 17 are applied again, but in variation of the order in which the uncertain information is processed, namely by progressing in the direction of the arrows D from the bottom at the right to the top at the left. This will result in a correction of the uncertain information of fields 32 and 33 by U-matrix 16, and of the uncertain information of fields 29 and 28 by U-matrix 17.

FIG. 4a depicts a pattern 35 which contains prior to the scanning a boundary line 36, separating a section with the color A from a section with the color B. If this pattern 35 is scanned in the manner as indicated in FIG. 4a by the square screen form, it will not be possible to assign any color information to those fields which are more or less bisected by the boundary line 36, because neither the color A nor the color B are clearly preponderant. Therefore, as shown by the blocked-out form of FIG. 4b, only sections 37 and 38 of the pattern 35 will carry color information, being assigned colors A and B respectively, and several uncertain fields 12 will be generated within the region of the boundary line 36. A correction of the uncertain information of the corner field 39 can be accomplished by corner-matrixes 40 to 43, which are shown in FIG. 4c in the form of four examples.

Figure 4B:
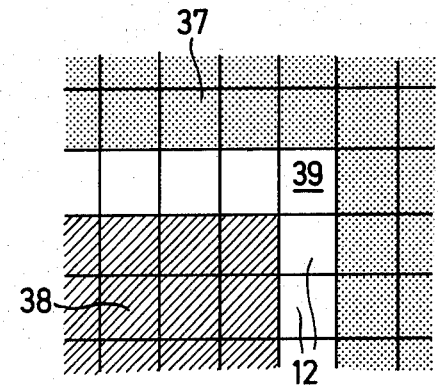
Figure 4C:
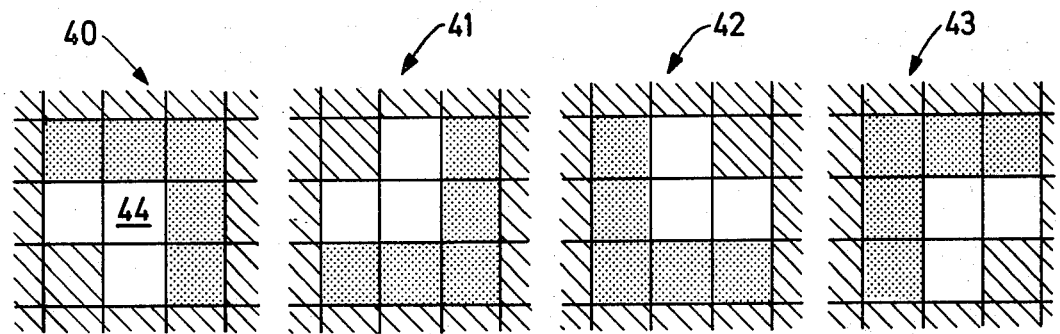

Corner-matrix 40, shown by FIG. 4c, specifies that the color A is assigned to the center uncertain field 44 if, first, the fields 4 to 8 (see FIG. 1) adjacent to this uncertain field 44 possess the color A and if, secondly, the adjacent fields 1 and 3 are uncertain fields. Therefore, when the matrix 40 is applied to the pattern shown by FIG. 4b, the uncertain information assigned to uncertain field 39 would be changed to the color information corresponding to color A. The corner-matrixes 41 to 43 would result in a correction if the pattern shown by FIG. 4b is turned by 90°, 180° or 270° respectively. The corner-matrixes can also be applied successively to each uncertain information in the same manner as the U-matrixes shown in FIG. 2.

Figure 5A:
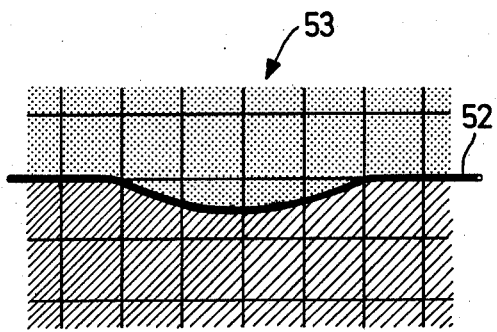
Figure 5B:
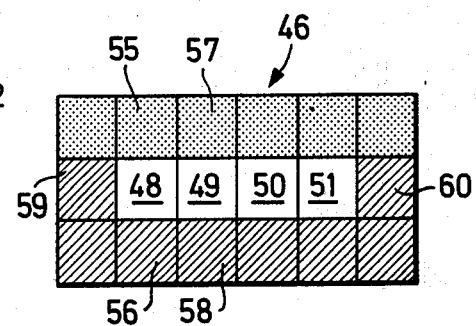

FIG. 5b depicts a variable chain-matrix 46. The word "chain" indicates that this matrix is applied to the uncertain information of at least two uncertain fields such as 48 to 51 which are arranged in a defined direction and have a defined distance, thus forming a chain. In case of the matrix 46, shown by FIG. 5b, the uncertain fields 48 to 51 form a straight chain which are contiguous to each other. Such chains can be generated for example by the fact that a boundary line 52 in FIG. 5a, separating two sections of a pattern 53 of different colors, has an undesirable dent. A comparison between the FIGS. 5a and 5b shows clearly that the uncertain fields 48 to 51 correspond to those fields of the pattern 53 which do not allow a clear definition as to color. The chain-matrix 46, shown by FIG. 5b, requires that (a) on one side of the chain there are located only pattern fields 55, 57, etc. of one continuous color, for example A, that (b) the fields 56, 58 etc., located on the other side, have one identical color, for example color B, a color which must be different from the color of the fields 55, 57, etc., and finally that (c) the starting field 59 and the final field 60 of the chain must both have the same color, this color corresponding either with the color of fields 55, 57, etc. or with the color of fields 56, 58, etc. If all these conditions are met, the chain-matrix 46 determines that the uncertain information of fields 48 to 51 is converted to that color information which corresponds to the color of the starting and final fields 59, 60.

When the chain-matrix 46 is applied, while processing the pattern in direction C (see FIG. 3), the uncertain field 48 is used as the starting point. Then there is checked the color information assigned to the adjacent fields 55 and 56. If these two colors do not differ, the testing is terminated because the requirements are not met. Otherwise, the uncertain field 49 is checked to test adjacent fields 57 and 58. So long as the requirements (see FIG. 5b) are met, the testing is continued regardless of the length of the chain until the final field 60 is found. If this field has the same color information as the starting field 59, the correction is carried out in the manner explained above.

The chain of the uncertain fields 48 to 51 is thus variable in its length, as to the number of fields with uncertain information, because the requirements, specified by the chain-matrix 46, will remain in force so long as adjacent uncertain fields are found, and there occurs above the chain one color only, and below the chain the other color. The chain-matrix 46 can be applied with the same effect either in direction of arrows C or arrows D (FIG. 3) because only the starting and the final fields are interchanged thereby.

Figure 6:
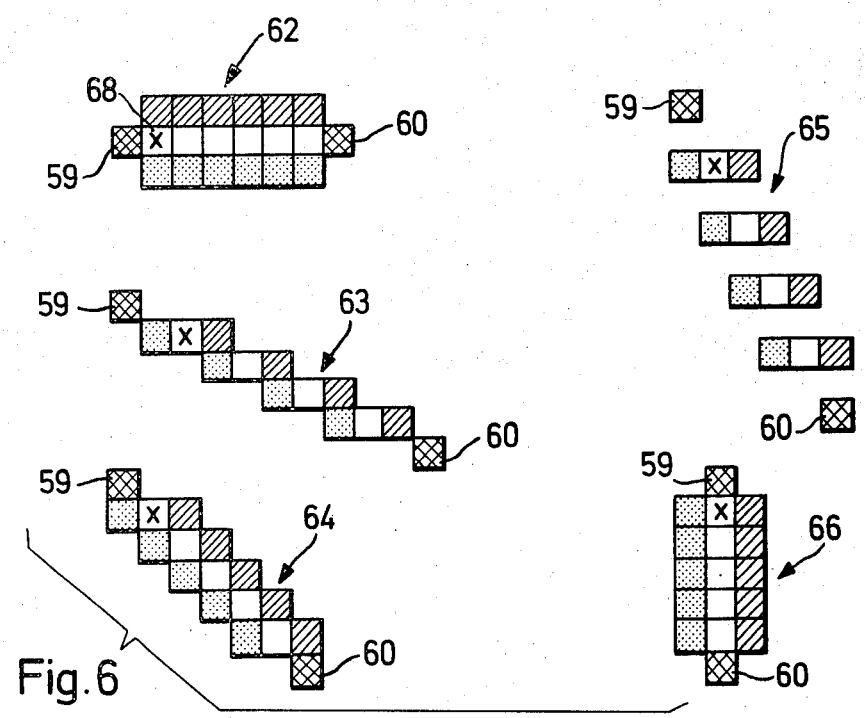

The correction matrix 46 as shown by FIG. 5b can be modified in any manner desired. FIG. 6 shows, in addition to the chain-matrix 62, which differs from the matrix 46 only in that the color information of the starting and final fields 59, 60 can be either identical or different, four other chain-matrixes 63 to 66, where, in each case, the uncertain field 68, identified by an X, is the first uncertain field of the chain. Again, the length of the chains is variable, which means that the processing is always continued until either the adjacent fields fail to meet the requirements, as specified in FIG. 6, or until, during the search for another chain-continuing uncertain field, the final field 60 is reached. The chains illustrated in FIG. 6 are suitable only for the processing of the pattern in direction of arrows C (FIG. 3). For the processing in the direction according to arrows D there are suitable only matrixes which, in contrast to the matrixes shown by FIG. 6, are based on variable chains which extend from the bottom to the top, or from the bottom at the left to the top at the right. It is also possible, if desired, to use chain-matrixes of fixed length, or chain-matrixes where the "chain" consists of one single uncertain field only.

Figures 7A, 7B:
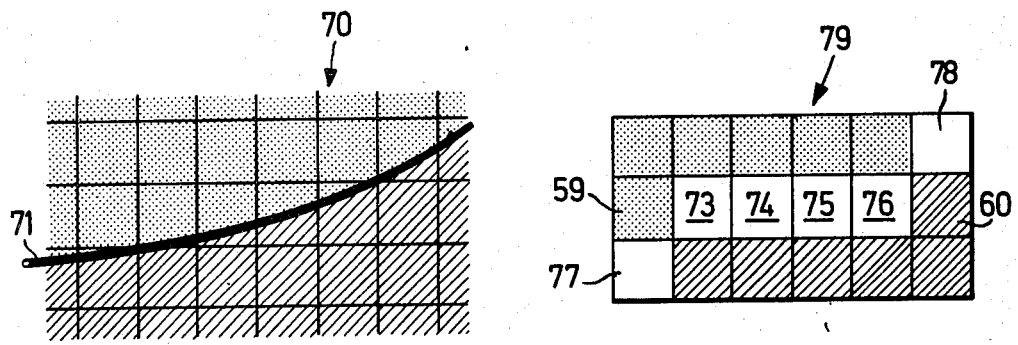

If in case of variable chains the starting and final fields do not possess the same color, with all matrixes shown by FIG. 6 being designed for such eventuality, a configuration as shown by FIGS. 7a and 7b could occur. It is generated when a pattern 70 has a boundary line 71 which extends obliquely between two sections of different colors, resulting, as shown by the blocked-out form of FIG. 7b, in one linear chain of uncertain fields 73 to 76 and two additional uncertain fields 77 and 78. A chain-matrix 79 can be applied here which specifies, as in case of the matrix 46 of FIG. 5, that the adjacent fields, located above and below the chain, possess only one or the other color, but in contrast to the chain-matrix 46 specifies additionally that the starting and final fields 59 and 60 must have different colors and that these colors must match the two colors of the adjacent fields. If the conditions of chain-matrix 79 are met, the uncertain information of the uncertain fields 73 and 74 are converted to the color information assigned to the starting field 59, while the color information of the final field 60 is assigned to the uncertain fields 75 and 76. In the event that an uneven number of uncertain fields are involved, the center field will be given a color information on a selective basis, the assignment made at random or systematically, using either the color of the starting or of the final field, or with that color of the fields 59, 60 which has the greater preponderance. The uncertain fields 77 and 78 are not covered by the matrix 79 because these fields are not being considered by the corresponding matrix 46 (FIG. 5b) either. Matrix 62 (FIG. 6) thus corresponds to matrix 46 (FIG. 5b) or to matrix 79 (FIG. 7b).

Figure 8A:
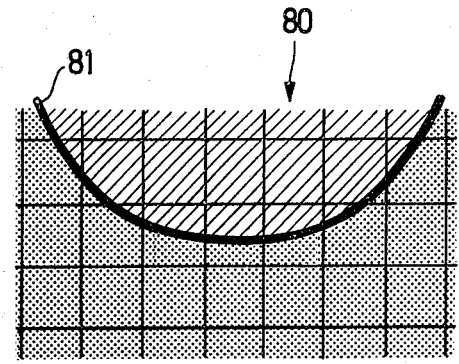
Figure 8B:
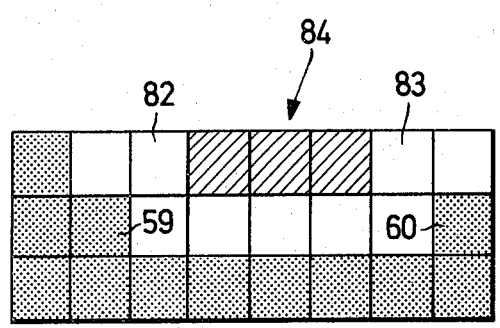

FIG. 8a depicts a pattern 80 with a boundary line 81, resulting in a linear chain with the starting and final fields 60 and 59 respectively, as shown in screened form in FIG. 8b. In contrast to the chains described above, the adjacent fields, located above or below the chain, do not always carry color (information), because, in the example shown, the adjacent fields 82 and 83 are uncertain fields. In order to accomplish corrections under such circumstances, it is possible to modify the above described chain-matrixes for certain exceptional cases in such manner that the appearance of uncertain fields in addition to color fields is allowable on one side of the chain, with all other specifications remaining in force. Thus, there is being established, for example, a chain-matrix 84 which is identical with the chain-matrix 46 with the exception that on one side of the chain uncertain fields 82 and 83 are permissible. If necessary, such uncertain fields can be permitted also in case of chain-matrixes 62 to 66 (FIG. 6). Finally, it would also be feasible to consider uncertain fields on both sides of a chain, or with reference to matrix 79 (FIG. 7b) starting and final fields with different color information.

Figure 9A:
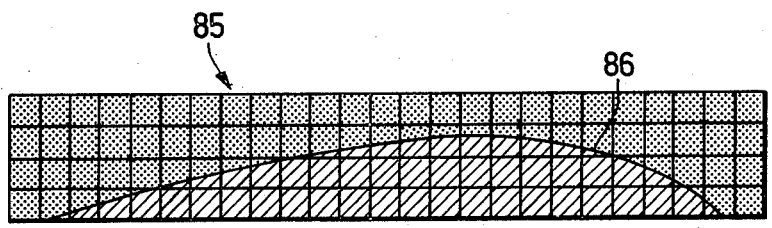
Figure 9B:
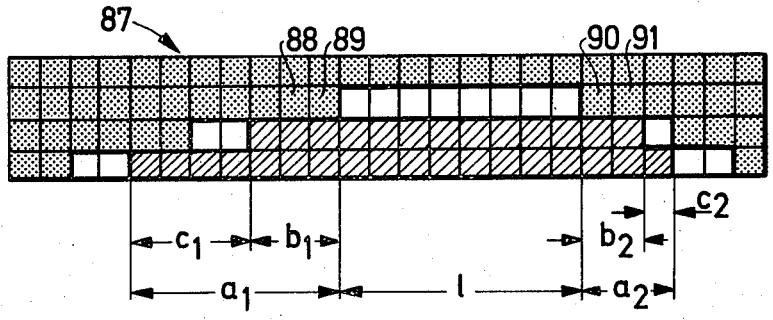

FIG. 9a illustrates a special case which will arise rather frequently whenever horizontal chain-matrixes 46 or 84 (FIGS. 5b or 8b respectively) or vertical chain-matrixes 66 (FIG. 6) are being applied. Such special case is demonstrated by pattern 85 with a boundary line 86 which has a relatively flat convex curvature and which extends across a multitude of fields placed next to each other within one row or column. If the pattern 85 is scanned by an opto-electronic device and then printed out in accordance with the invention, it will appear in the screened form as shown by FIG. 9b, assuming that the color of fields 88 to 91 is recognized as color A. Therefore, if chain-matrix 46 (FIG. 5b) is applied to line 1 of the screened form 87, all uncertain fields of this line would be converted to color A, an undesirable action, because it would cause an annoying flattening of the pattern. The use of matrix 84 (FIG. 8b) would lead to the same result.

Figure 9C:
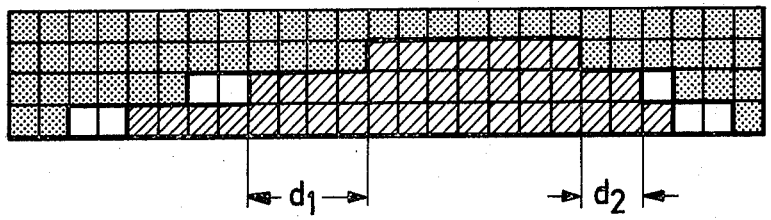

In order to insure a sensible correction, it can be specified that prior to the completion of the correction demanded by matrix 46, it is to be determined whether the boundary line 86 has a convex curvature. In case of the example shown by FIG. 9 such determination could be accomplished in such manner that upon the detection of a chain (line 1 of FIG. 9b) the next lines 2 and 3 are tested first in order to determine the number of fields $a_1$, $a_2$, $b_1$ and $b_2$ in the manner shown by FIG. 9b, with the uncertain fields not being counted. A convex shape will be present according to definition if $c_1 = a_1 - b_1 \geqq 0$ and $c_2 = a_2 - b_2 \geqq 0$. The values $d_1$ and $d_2$ of the chain are then computed by use of the equations $d_1 = b_1$, if $b_1 \geqq c_1$, or otherwise $d_1 = c_1$ and $d_2 = b_2$, if $b_2 \geqq c_2$, or otherwise $d_2 = c_2$ (FIG. 9c), and finally there is assigned the color A to those units of the chain which are defined by the values $d_1$ and $d_2$, while the color B is assigned to the remaining fields of the chains, so that after this correction line 1 of the screened pattern will appear as shown by FIG. 9c.

In line 1 of the pattern it is further specified, in deviation from the correction required by matrix 46 and the correction statement described in the paragraph above, that at least k uncertain fields are assigned the color code B. Only in one specific case, namely if $1 + b_1 + b_2 - d_1 - d_2 < k$, whereby 1 represents the number of uncertain fields of the chain (see FIG. 9b), will the color A be assigned to all uncertain fields. Vertical chains are processed in similar manner.

The method described above will lead to identical results, whether carried out manually or automatically and is distinguished by the advantageous feature that it makes possible a completely objective correction of patterns. Prior to the processing of the uncertain information by means of the above described correction matrixes there is preferably carried out a pre-processing of the information obtained by the scanning of the pattern. This pre-processing consists of the use of erasing matrixes and is applied to all color information in such manner that the information of fields adjacent to each field carrying a color information are tested to determine whether certain characteristics exist, and if such characteristics are found to exist, the color information is replaced by an uncertain information.

Such pre-processing will be especially appropriate in cases where a clear color information has been found by the scanning device but where for one reason or another there is a great probability that this color information can not be correct. For example, if one block of a pattern being scanned is blue in its entirety, and if a non-blue color information is assigned to a few fields within this block, it can be concluded, without specific comparison with the original pattern, that all non-blue color information is due to an error in scanning.

The erasing matrix can, for example, be a matrix which specifies that a color information, appearing as color B, is to be treated as an error if all fields, adjacent to the field carrying this specific color information, have a color information analogous to color A. An erasing matrix of this type would correspond to the sketch depicted on the right side of FIG. 1, assuming that its center field represents a field of the color B. A color information is processed by the erasing matrix in such manner that each color information of the color B is checked to determine whether all fields adjacent to such color information carry a color information of color A (or vice versa). If these conditions are met, the color information of the center field is erased, which means it is converted to an uncertain information. When this uncertain information is processed later on, by use of a correction matrix, for example a U-matrix as shown by FIG. 2, the uncertain field will then be changed to a color information of the color A, a change which in almost all instances will represent the proper correction. It will thus become possible to correct 50 to 100 percent of those color informations which carry erroneous color data, assigned in the course of the scanning operation, not counting any uncertain color information assigned because a color was not readily recognizable. In case of multi-colored patterns a color information can also be erased but without the condition that all adjacent fields must possess the same color if all adjacent fields have colors which differ from the color of the field being tested. It is also possible, if so desired, to employ complex erasing matrixes which permit the simultaneous erasure of more than one color information (for example of two adjacent fields with colors which deviate from a single-color pattern area), or matrixes which will permit the extension of an area being examined, if there is no clear-cut decision possible, in other words, variable matrixes.

Figure 10:
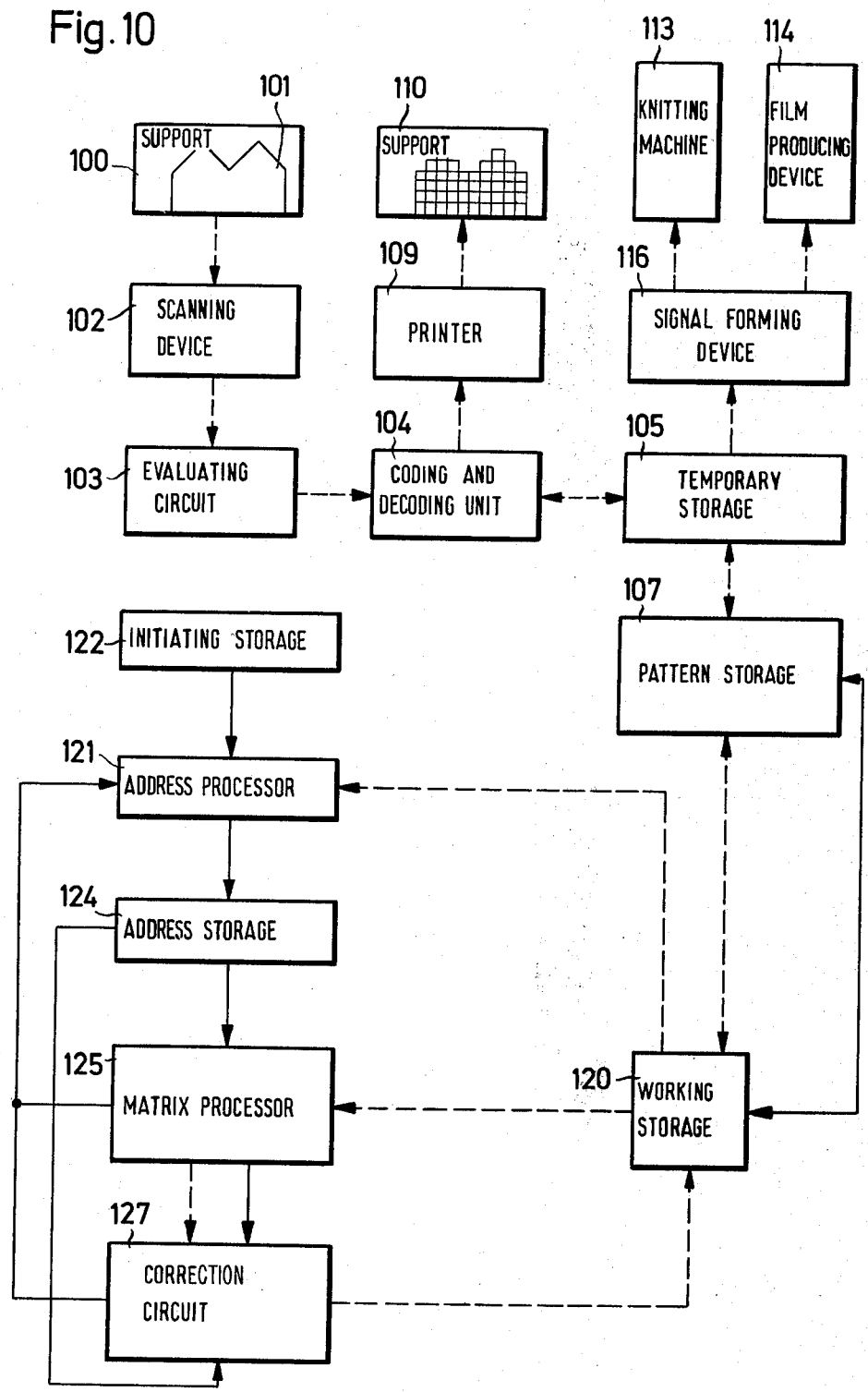
FIG. 10 shows a block diagram of an apparatus according to the invention.

Below, there will be described an example of an automated apparatus for the practical application of the process described above. The devices disclosed in U.S. Pat. Nos. 3,578,897 and 3,823,257 can be used for the scanning of a pattern, not yet screened. These devices comprise, as shown in FIG. 10, a support 100, for example a revolving cylinder, over which is stretched the pattern 101, not yet arranged in screen form. The pattern 101 is scanned by an opto-electronic scanning device 102 as in U.S. Pat. No. 3,578,897, its output signals being converted to color signals by an evaluating circuit 103, and are given the proper coding by a coding and decoding unit 104. The coded signals are fed by way of a temporary storage 105 into a pattern storage 107 which contains a magnetic tape, a punched tape or a core memory as storage means. The stored signals are fed, after the scanning and storage of the entire pattern, by way of the temporary storage 105, to a knitting machine 113 or to a device 114 which produces a control tape, for example in form of a film, for the electronic control of a machine reproducing the pattern. The stored signals can be brought into the appropriate form as required, by specifically designed machines represented by device 116.

In order to make possible the examination of the information stored in the pattern storage 107, these data can be fed, by way of the temporary storage and the coding and decoding unit 104 into a printer 109 which will display the pattern in the form of a screened image 110. It is also possible to use in place of the printer 109, a display unit which shows the pattern as a whole, or partial sections thereof in enlarged form.

If the known devices are used, it will become necessary to correct the screened image 110 being displayed point by point, and it is left to the discretion and subjective judgement of the designer how the corrections are to be accomplished. Upon the completion of the corrections, and unless the correction of individual fields will not lead automatically to a corresponding correction of the information stored in the pattern storage 107, the screened image 110 is mounted at the support 100, scanned in steps corresponding to the screen size and, if necessary, again displayed and corrected. The above described processing steps are repeated until the screened image 110 matches precisely the desired pattern, and until it is ascertained that the stored information also matches precisely the desired pattern. For the automation of the corrections there is provided (see FIG. 10, which shows the control wires in the form of solid lines, and wires serving for the transmission of information in the form of broken lines) a working storage 120, into which is read one block of the pattern at a time in order to allow block by block correction for large-sized patterns. The information which is present in the working storage 120, is read in sequence into an address processor 121 for access to the uncertain information. The sequence of the processing is determined by an initiating storage 122, connected to the address processor 121, which specifies the starting point within the pattern and the order of transfer to the address processor 121 of the information which is present in the working storage 120 (see, for example, the possibilities shown in FIG. 3). If the address processor finds an uncertain information, the read-out of information from the working storage 120 is interrupted. The address assigned to the uncertain information is stored in an address storage 124, connected to the address processor 121, which serves as starting address for a matrix processor 125 which is activated by a signal from the address storage 124.

The matrix processor 125 will test the adjacent areas of that uncertain field, the uncertain information of which has its address stored in the address storage 124, for the presence of certain characteristics, whereby these characteristics can be defined by one of the matrixes described in FIGS. 2 to 9. If the required characteristics do not exist, the matrix processor 125 will transmit an error signal which will activate the address processor 121 for a search for the next uncertain information.

If the conditions required by the matrix are met, the matrix processor 125 will transmit a correction signal which is fed into a correction circuit 127.

The matrix processor 125 will also transmit to the correction circuit 127 the color information which should be assigned to the tested uncertain field, if the conditions specified by the matrix are met. The correction signal may trigger first a testing for additional conditions in the correction circuit 127. These can be controls not specifically applicable to this matrix, and could for example lead to the overriding of the correction, if in the immediate proximity of the matrix more than two fields of different colors adjoin each other. The correction circuit 127 will then carry out the correction of the uncertain information, located in the working storage 120, which is associated with the address stored in the address storage 124. Upon completion of the correction, which can involve, in addition to the uncertain field identified by the address in the address storage 124, additional uncertain fields (for example in case of a chain-matrix), the correction circuit will generate a control signal which is fed into the address processor 121, causing the processor 121 to start again, and to search for the address of the next uncertain information. After the correction of the entire pattern and the utilization of all matrix processors provided for the pattern, whereby these processors can be connected in parallel with the matrix processor 125, the pattern is displayed again by means of the printer 109. It will now be necessary to correct all uncertain fields not previously eliminated, either manually or automatically by a modification of the processing (for example use of other operating parameters or new matrixes).

Figure 11:
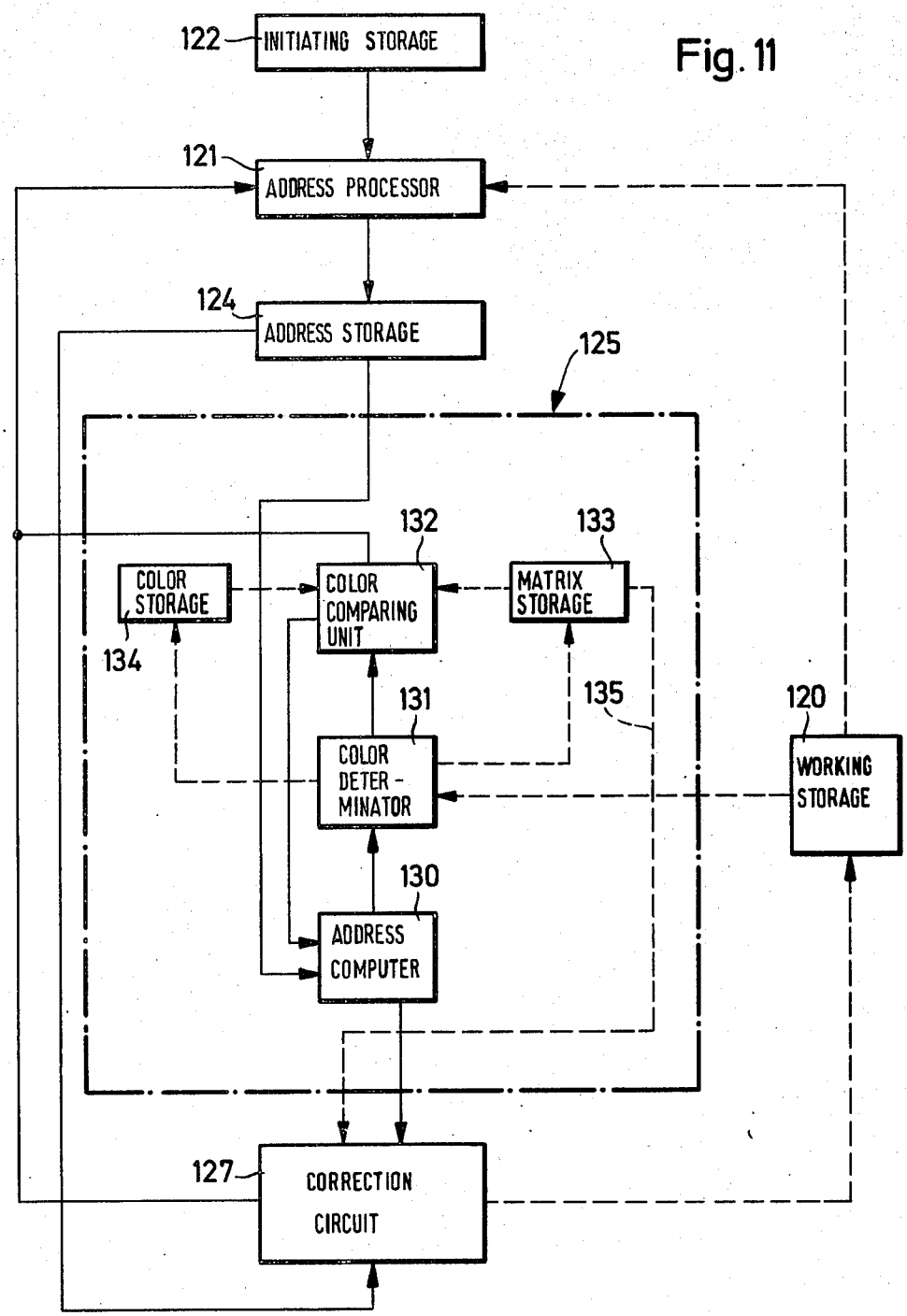
FIGS. 11 and 12 show practical examples of the matrix processor used in the apparatus of FIG. 10.

One species of the matrix processor 125 is shown in FIG. 11, assuming that the uncertain information is processed by means of a U-matrix as depicted by FIG. 2. Upon the storage of an uncertain information in the address storage 124, the latter activates an address computer 130 which will compute in succession the addresses of all informations which are assigned to the fields which are adjacent to the uncertain field carrying the uncertain information to be tested. For example, if the matrix processor is concerned with the matrix 16 of FIG. 2, the address computer 130 will compute in succession the addresses of information assigned to the adjacent fields 1 to 5 (see FIG. 1). When the address, assigned to the adjacent field 1, has been computed, the address storage 130 will activate a color determinator 131 which serves to determine the color information of the adjacent field 1. If the adjacent field 1 carries an uncertain information, the color determinator 131 emits an error signal which terminates this testing process, and which is transmitted further, by way of a color comparing unit 132 to the address processor 121 to initiate the search for the next uncertain information. If the color determinator 131 finds a color, the associated color information is stored in a matrix storage 133, and a signal is transmitted by way of the color comparing unit 132 to the address computer 130 to compute the address of the adjacent field 2. The color determinator 131 reads the information of the adjacent field 2 from the working storage 120 and feeds it into a color storage 134, unless the information is an uncertain information which would trigger an error signal to the address processor 121. The color comparing unit 132 will now test whether the color information placed in the color storage 134 matches the color information stored in the matrix storage 133, as required in case of a U-matrix. If the comparison is negative, the color comparing unit 132 will send an error signal because the conditions are not met. If the comparison is positive, a corresponding color comparison is then carried out for the adjacent fields 3,7 and 8 (in accordance with the definition given in FIG. 1). If the color of the last adjacent field 8 also matches the color information stored in the matrix storage, the color comparing unit 132 sends the correction signal which is transmitted, together with the address of the tested uncertain information (stored in address storage 124) and the color information (stored in matrix storage 133) to the correction circuit 127 via line 135 for the conversion of the tested uncertain information to the color information as specified by the matrix. The correction circuit 127 will then generate the control signal for re-starting the address processor 121.

Figure 12:
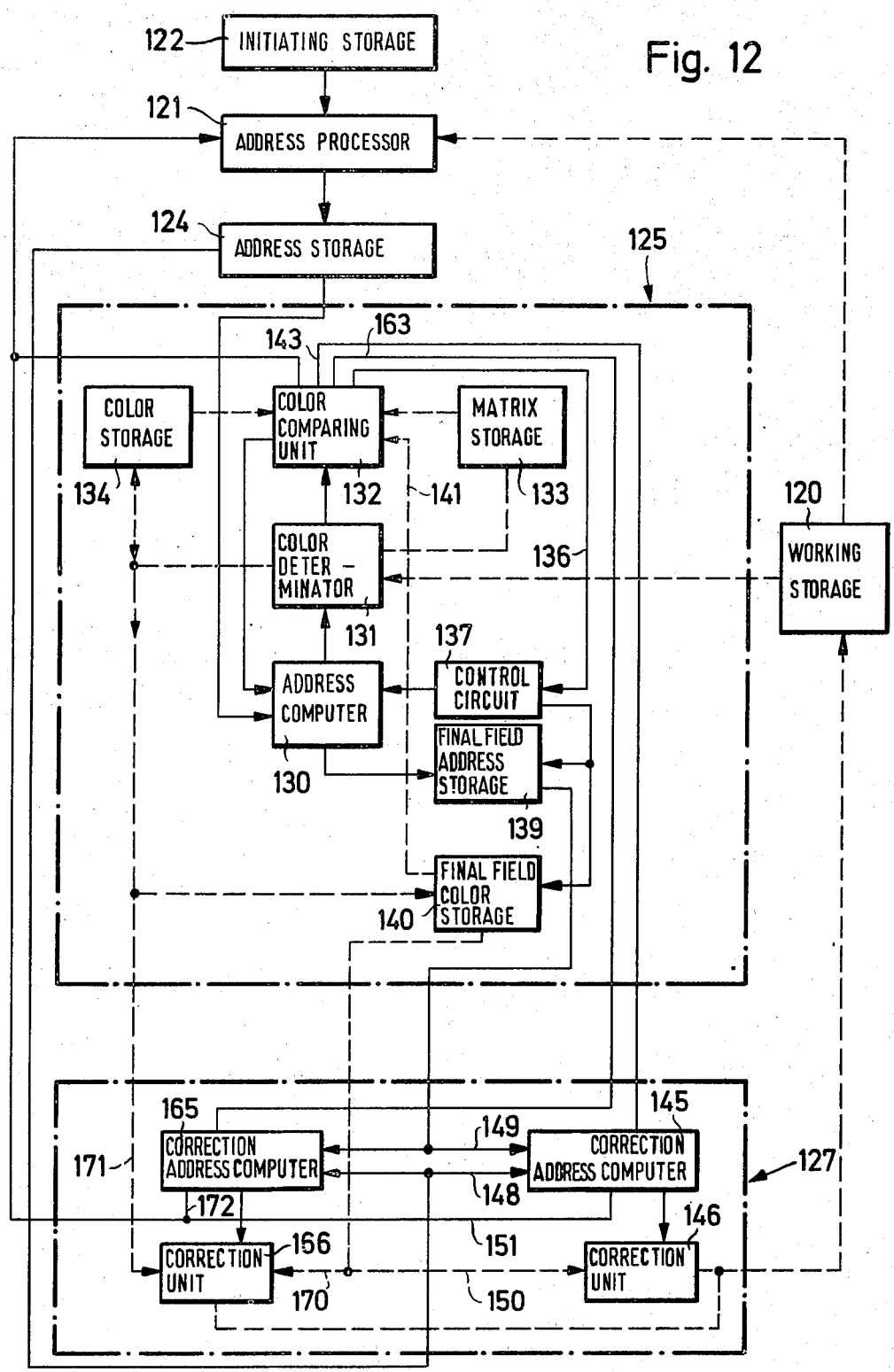

FIG. 12 shows a species of a matrix processor 125 for the practical use of variable chain-matrixes 46 and 79 as illustrated by FIGS. 5b and 7b. The address computer 130 is in this case programmed in such manner that it will compute, upon the detection of an uncertain field 48 (see FIG. 5b), first the address of the information assigned to the adjacent field 55, then the address of the information assigned to the adjacent field 56, and then the addresses of the information assigned to fields 49, 57, 58, 50 etc. After generation of the address of the information assigned to the adjacent field 55, the color determinator 131 checks whether this information is an uncertain information or a color information. If it is an uncertain information, the color comparing unit 132 sends an error signal because the conditions specified by the matrix are not met. If a color information is found, color A in case of the example shown by FIG. 5b, such information is stored in the matrix storage 133. The information of the adjacent field 56 is then checked in the same manner. If this information is an uncertain information or an A-color information, the operation will be terminated. If the color information concerns color B or a third color, the information is stored in the matrix storage 133. The checking of the information assigned to field 49 must show an uncertain information. Checking of the information assigned to the adjacent field 57 however must show an A-color information, the testing being accomplished with the aid of the color storage 134, the color comparing unit 132 and the matrix storage 133 in a manner analogous to the example of FIG. 11. The next information, assigned to the adjacent field 58, must be a color information of color B or of the third color.

This type of checking is continued either until an adjacent field above the chain fails to show the color A or an adjacent field below the chain fails to show the color B or the third color respectively, in which case the operation is terminated, because the specified conditions are not met, or until the end of the chain having the uncertain fields is reached, in other words, if the final field 60 is reached (see FIG. 5b). If the final field 60 has not the color A or B or the third color, the conditions of matrix 46 are not met and the checking operation is terminated.

However, if the final field 60 has the color A, B or the third color, comparing unit 132 emits a signal through line 136, which is fed into a control circuit 137, this circuit being connected with the address computer 130 as well as with a final field address storage 139 and a final field color storage 140. When the signal appears in the line 136, the address of the final field 60, located in the address computer 130, is stored in the final field address storage 139, and the color information of the final field 60, present in the color storage 134, is stored in the final field color storage 140. The control circuit 137 then sends to the address computer the command, to compute the address of the starting field 59 of the chain 5b, which can be accomplished by means of the address of the first uncertain field 48, present in the address storage 124. When the address of the starting field 59 has been found, the color information of this field is read into the color storage 134 and compared with the color information present in the final field color storage 140 by use of a line 141 from the color comparing unit 132. There are now two alternatives. The first case concerns a chain-matrix 46 (FIG. 5b) where the color of the starting field 59 matches the color of the final field 60. This will cause the color comparing unit 132 to send via its first output 143, a correction signal which is fed into a correction address computer 145, its output connected to a correction unit 146. The correction address computer 145 now computes in succession all addresses which are assigned to the uncertain information of the uncertain fields 48 to 51, starting with the address of the uncertain information of the first uncertain field 48, this address being present in the address storage 124 and supplied by way of line 148, and ending with the address of the uncertain information of the last uncertain field 51, whereby the address of the uncertain field 51 will always correspond, regardless of the length of the chain being tested, to that address which is stored in the final field address storage 139 and supplied by way of line 149. At the same time the correction unit 146 is directed to convert at each address, generated by the correction address computer 145, the uncertain information stored in the working storage 120 to a color information in conformity with the color information stored in the final field color storage and determined by way of line 150. Upon conclusion of the correction operation the correction address computer 145 emits a control signal by way of line 151, which is fed into the address processor 121, so that the address of another, new uncertain field can be processed.

In the second case (see FIG. 6) the color of the final field 60 is not identical with the color of the starting field 59. This will cause the color comparing unit 132 to send from its other output 163 a correction signal which is fed into a correction address computer 165, its output side being connected to a correction unit 166. The correction address computer 165 now computes in succession, in the same manner as the correction address computer 145, the addresses of the uncertain information of the chain being tested, while at the same time the correction unit 166 is instructed, to assign to the first half of the uncertain fields the color of the starting field 59, and to the second half of the uncertain fields the color of the final field 60, whereby the required color information are obtained by way of lines 170 (color information of the final field) and 171 (color information of the starting field, still stored in color storage 134). Finally, the correction address computer 165 will transmit a control signal by way of line 172.

The description above demonstrates that it is possible to use in practice all variable chain-matrixes by means of the matrix processor 125 and the correction circuit 127 as shown in FIG. 12. Other matrixes can also be used in practice by employing appropriate matrix processors or correction circuits respectively. If the circuitry of FIG. 12 is to be used in cases where the contours have a convex shape (FIG. 9), which is easily accomplished by any horizontal or vertical chain-matrixes with end fields of identical colors, there exists the possibility to accomplish a correction where the uncertain information is replaced, in whole or part, by color information which differs in color from the color information of the starting and final fields (accentuating the convexity).

A matrix processor 125 and a correction circuit 127, as shown by FIG. 11, can be used after a few minor changes for the pre-processing of the pattern. Since an erasing matrix is applied to any color information, the testing procedure, utilizing the matrix processor shown by FIG. 11, will be as follows:

Upon the detection of a color information its associated address will be stored in the address storage 124, and the color information proper in the matrix storage 133. The address computer 130 is then activated for the computation of the addresses of all color information assigned to the adjacent fields 1 to 8 (FIG. 1), assuming that the central field carries the color being tested. The color information, assigned to the adjacent fields 1 to 8, are thus compared one after the other with the color information present in the matrix storage, unless the operation is terminated because a color information is found which is identical with the color information being tested. However, if the conditions specified by the matrix are met, up to and including adjacent field 8, the address computer 132 will transmit to the correction circuit 127 a correction signal, instructing the latter to convert the color information being tested to an uncertain information. Therefore, this arrangement differs from the block diagram of FIG. 11 substantially only by the features that the address computer 130 is programmed in accordance with the specifications of the erasing matrix, that the line 135 can be omitted, and that the correction circuit 127 does not convert an uncertain information to a color information but a color information to an uncertain information.

The above described correction of the information obtained by the scanning of a pattern can also be carried out by the use of suitable computer systems, for example the type 1800 of the International Business Machines Corporation, Armonk, N. Y. USA, of the type PDP 11/40 of the Digital Equipment Corporation, Maynard, Mass., USA, thereby automating the processing using for example the programming shown by FIGS. 13 and 14.

Figure 13:
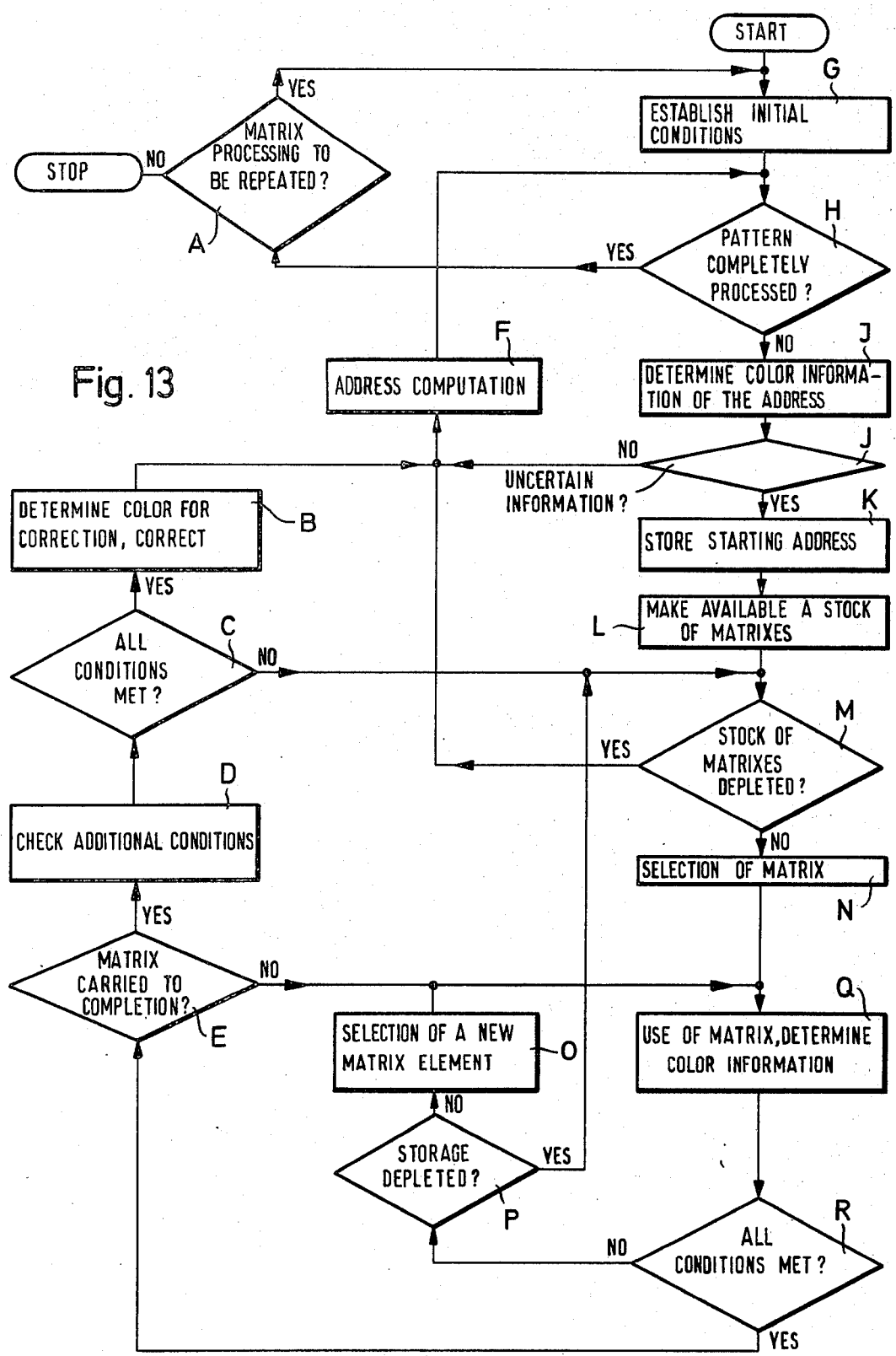
FIGS. 13 and 14 depict two flow charts, relating to the application of the method of the invention by means of a computer.

The flow diagram, shown by FIG. 13, using rhombic blocks for inquiries and rectangular blocks for statements, is applicable to correction matrixes of any type. The block G "establish initial conditions" means for example that a minimum chain length of two consecutive uncertain fields and a practically unlimited maximum length will be established, or that the type, number, order and routing of the matrixes, to be used for the uncertain information, will be specified, which can be accomplished by the appropriate programming of the address computer 130. The initial conditions can also specify how uncertain information, found to be located at the end of the pattern, is to be processed. The most simple solution in such cases would be, to fill the fields which are missing but needed for the application of a matrix by the fields which are located at the diametrically opposite end of the pattern because these sections will join each other during the reproduction if the pattern is repeated (a so-called rapport contact). However, preferably only a few lines, or columns respectively, should be used for such replacement in order to force, in the case of variable matrixes, a termination of the testing operation if periodic errors occur, and the number of lines or columns being substituted should be variable. The initial conditions finally cover the specification of the starting address in the initiating storage 122, that is the field where the processing of the entire pattern will begin and which will be influenced, for example, by the routing (arrows C and D respectively in FIG. 3).

The block L "make available a stock of matrixes" means that all matrixes of the stock are applied in succession and in the order specified. FIGS. 11 and 12 show only one matrix processor 125. However, preferably, several matrixes of the same kind (for example all U-matrixes as shown in FIG. 2 and/or several dissimilar matrixes (for example U-matrixes, corner-matrixes (FIG. 4) and chain-matrixes (FIGS. 5 or 7) and/or identical matrixes in various directions are applied in succession.

The block Q "use of matrix, determine color information" deals with the processing of uncertain information by a matrix, while the block R "all conditions met?" applies to each individual adjacent field of the uncertain field tested. If fixed matrixes or variable matrixes of the above dicussed type (for example FIGS. 5 and 6) are involved, the block E "matrix carried to completion?" determined whether all adjacent fields, covered by the matrix being used, have been tested. If this is the case, a correction of the uncertain information will be accomplished in the above described manner, whereby the block D "check additional conditions" allows the inclusion of any additional specifications, for example a chain of specific length, or use of certain equations when using the matrix shown by FIG. 9. When a correction is completed, the address of the next uncertain information is generated so that a matrix can be reused. If it is determined by the block E "matrix carried to completion?" that all fields specified by the matrix have not yet been tested, the use of the matrix is continued in the manner described. If at any one point the conditions are not met, that is if the specified characteristics are not present any longer, the block P "storage depleted?" will send a "yes" signal because none of the matrixes described here permit a free selection of the individual matrix components. By way of the block M "stock of matrixes depleted?" there is then either selected a new matrix N or a new address F, while the block H "pattern processed completely?" permits a repeat of the processing of the entire pattern A, for example in another direction, or a termination of the correction process.

The block O "selection of a new matrix element" is provided for special cases where not only the length but also the form of the matrixes can be variable. Matrixes of variable form are matrixes which will permit, in case of non-fulfillment of the specified conditions, the search in other directions for additional, identical or other matrix elements. It would be possible, for example, to replace the matrixes 63 to 66, shown in FIG. 6, by one single matrix of variable form by specifying that after detection of the uncertain field 68 a search is to be made for the additional uncertain fields in succession and in the direction as determined by matrixes 63 to 66, whereby various sets of conditions can be introduced to cover the additional uncertain fields found in diverse directions. All these possibilities are covered in FIG. 13 by the block "selection of a new matrix element".

Figure 14:
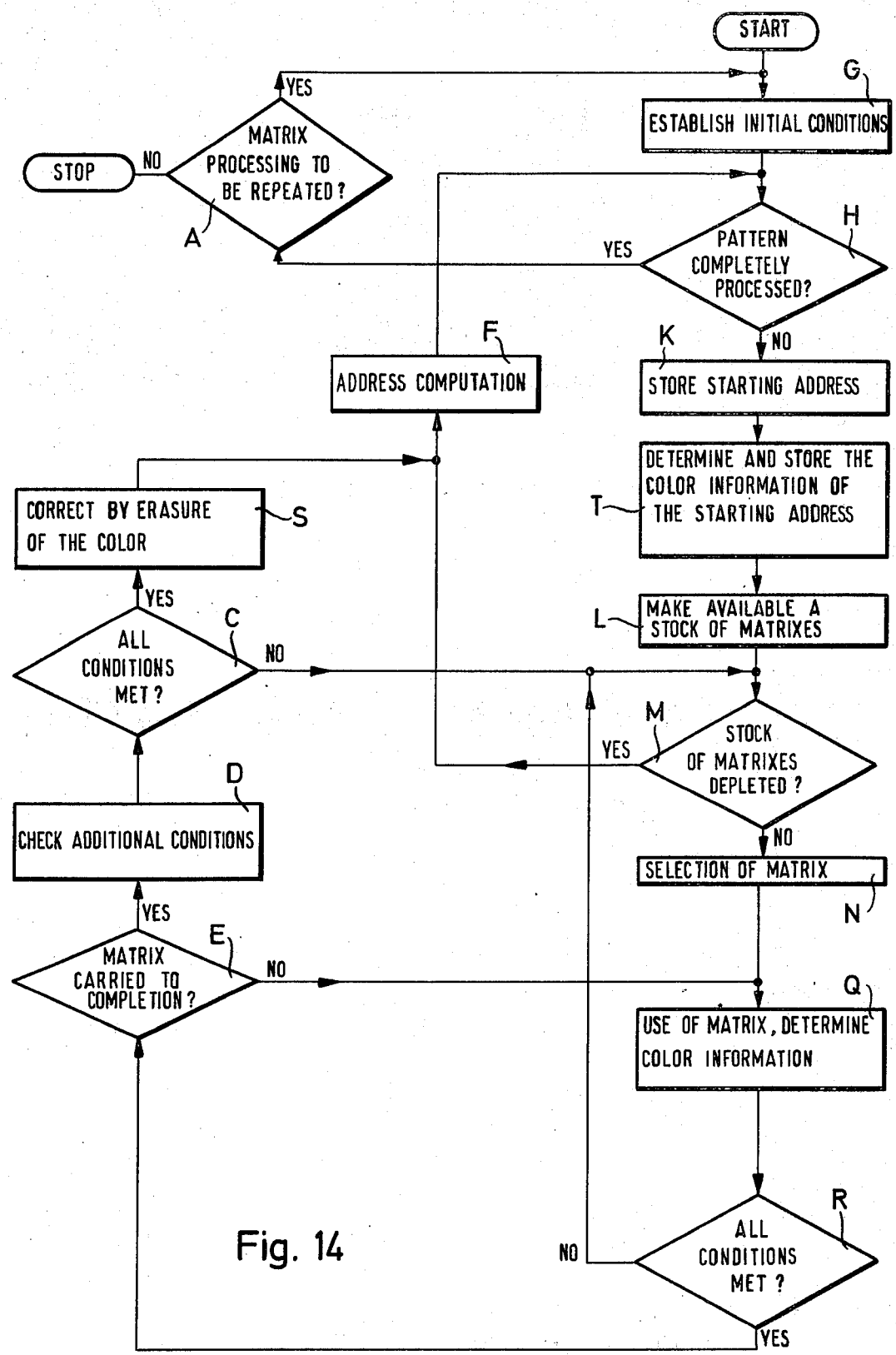

The flow diagram shown in FIG. 14 is applicable to erasing matrixes of all types and a majority of its blocks have already been described in connection with the flow chart of FIG. 13. Blocks which differ from FIG. 13 are first the block S "correct by erasure of the color" because the processing of the pattern by the use of erasing matrixes involves the conversion of all color information, which meet the conditions specified, to uncertain information. Secondly, there is provided a block T "determine and store the color information of the starting address" because it is necessary to compare the color information of the adjacent fields with the color information of the starting address.

Figure 15A:
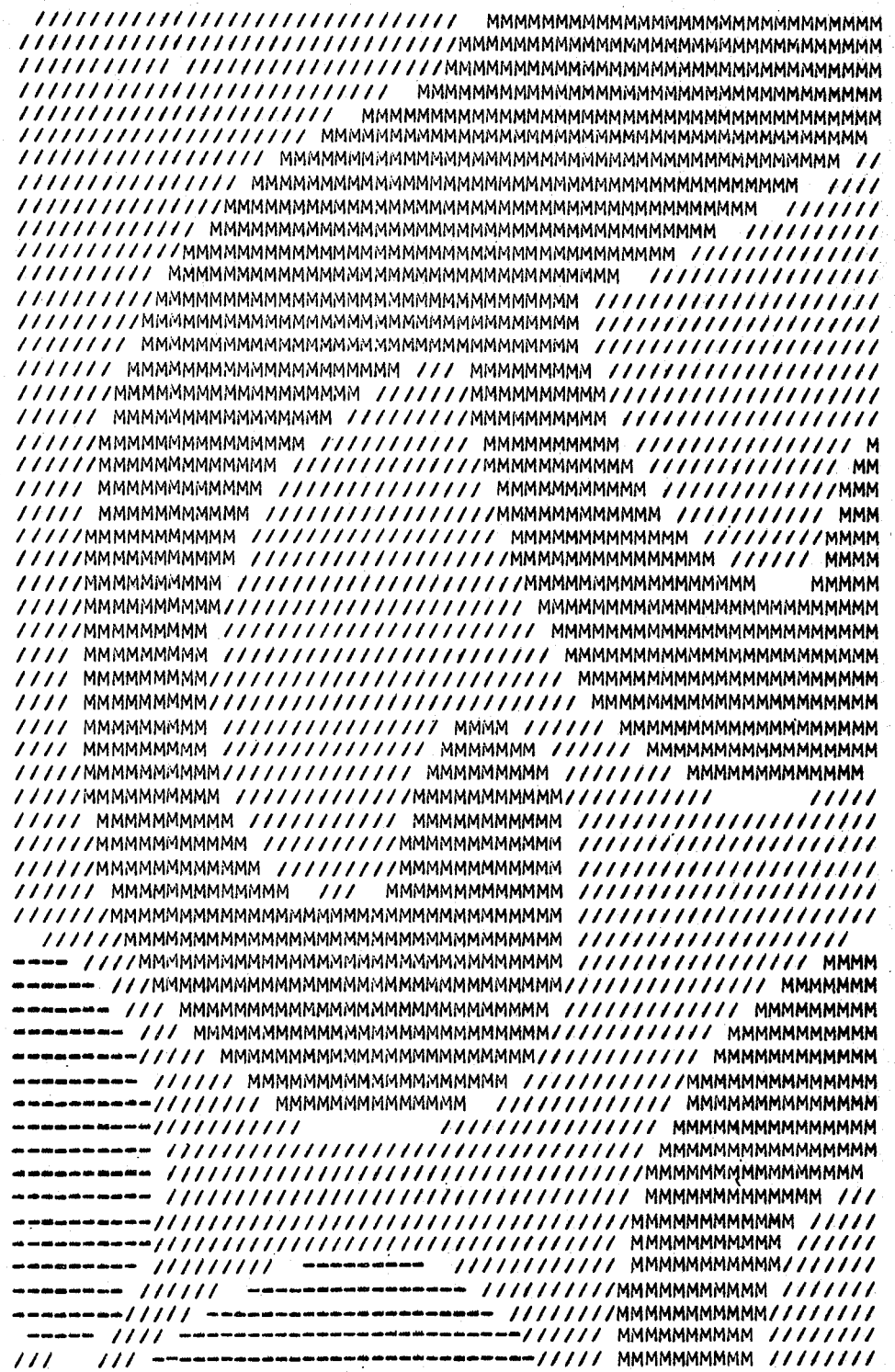
FIGS. 15a to 16c depict two patterns, printed out without and with the application of the method proposed by the invention.

FIGS. 15a and b and 16a and b show by use of an example the advantageous results which can be attained by the method proposed by the invention. FIG. 15a depicts a three-colored pattern, where the first color is represented by slanted lines (/), the second color by horizontal lines (—), and the third color by the letters M. The pattern so shown was obtained by scanning a pattern, not screened, by the apparatus described in FIG. 10, storing it on a magnetic tape, and then printing it out in screened form. The uncertain fields are represented by blank spaces. The uncertain field which appears in the third line, twelfth column (counted from the top and from the left), was probably generated in that manner that an incorrect color information was assigned to this field, which was subsequently detected during the pre-processing operation and converted to an uncertain information.

The section of the pattern depicted by FIG. 15a is one part of a pattern which comprises 240 lines and 163 columns, of which 20 lines and columns each are a pattern repeat, thus making possible a visual test of the "rapport contact". The pattern contains a total of 1,806 uncertain fields, which is 4.6% of all fields of the pattern. The uncertain information of this pattern was processed first by means of the four U-matrixes shown in FIG. 2, and then by the four corner-matrixes shown in FIG. 4, with the result that 50 items of uncertain information (approximately 3% of all fields carrying uncertain information) could be converted to color information. This was followed by a processing of the remaining uncertain information by means of various variable matrixes of the types described on the basis of FIGS. 5 to 7, resulting in the elimination of 1,182 additional uncertain fields (approximately 66% of all uncertain fields).

As a next step matrixes shown in FIG. 8 as well as analogous matrixes with starting and final fields of different color information were applied. In order to avoid erroneous decisions during this step, the processing of the pattern by means of these specific matrixes is discontinued as soon as it has led to the correction of one individual chain. Thereupon, the entire pattern is processed again by means of all U-, corner- and variable matrixes until there is no further reduction in the number of uncertain fields. The processing of the pattern by means of the matrixes shown in FIG. 8 is then continued. Another 54 uncertain information items were eliminated in this manner (approximately 3% of all uncertain fields). The pattern so corrected was finally processed again by means of the variable matrixes according to FIGS. 5 to 7, whereby during this step a minimum chain length of one uncertain field was specified as permissible. During this step it was possible to eliminate another 27% of the uncertain fields, with the result that a total of 99% of all uncertain fields, shown in FIG. 15a, were converted to color information.

Figure 15B:
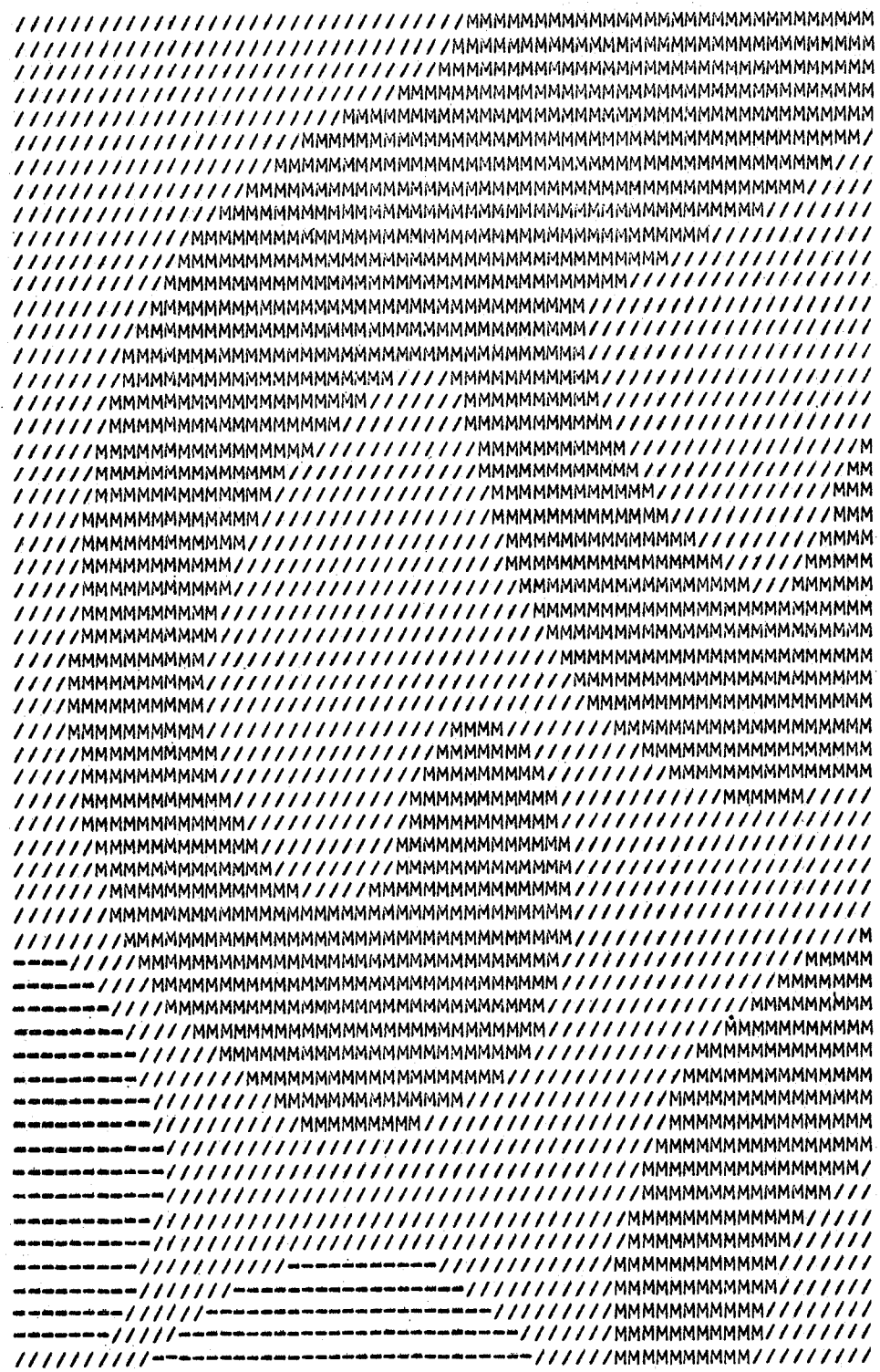

The result of the processing of the pattern is depicted in FIG. 15b. The processing of the pattern was carried out by use of an IBM computer, type 1800. FIG. 15b demostrates also that the character of the pattern is not changed by the objective processing.

Figure 16A:
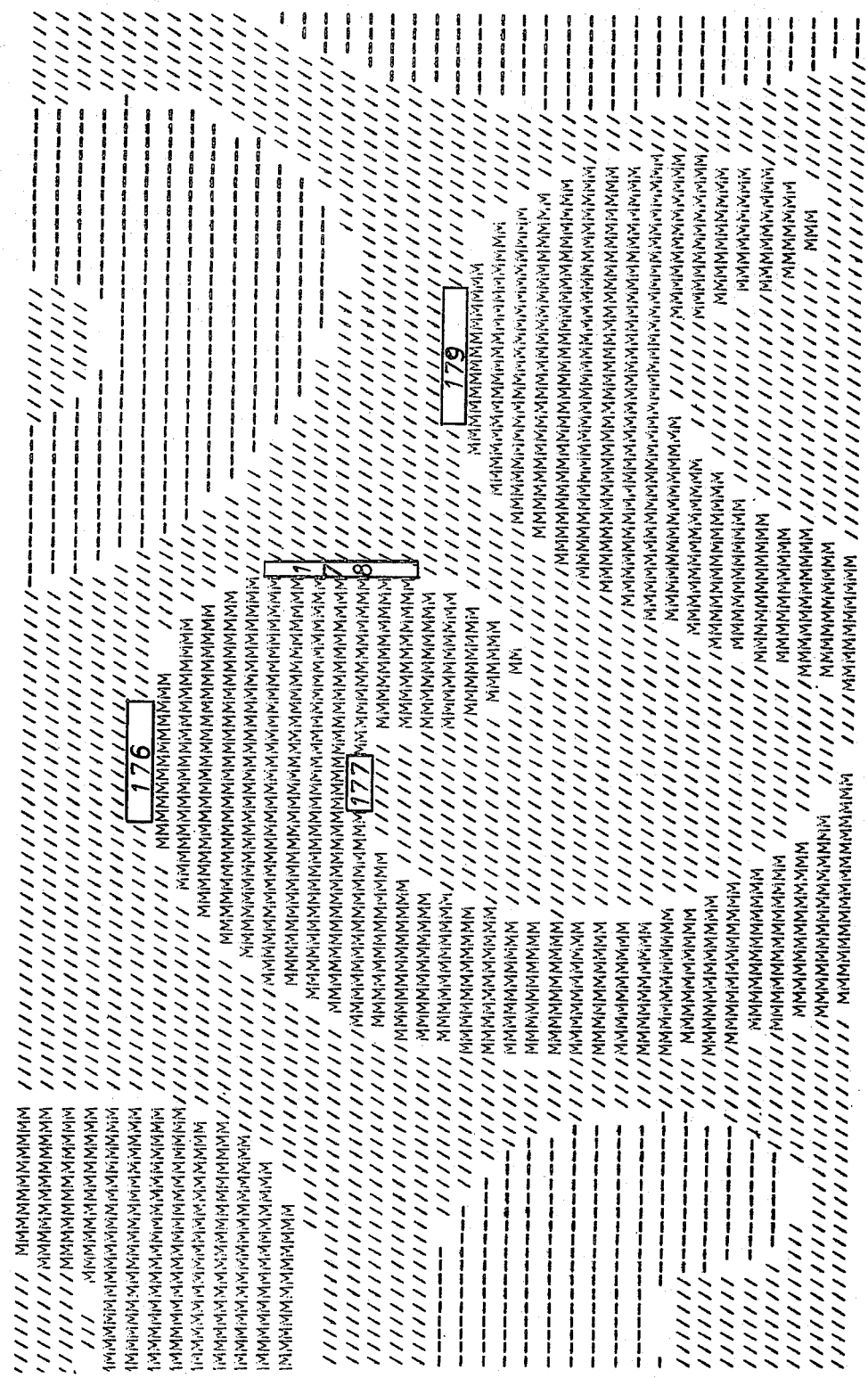
Figure 16B:
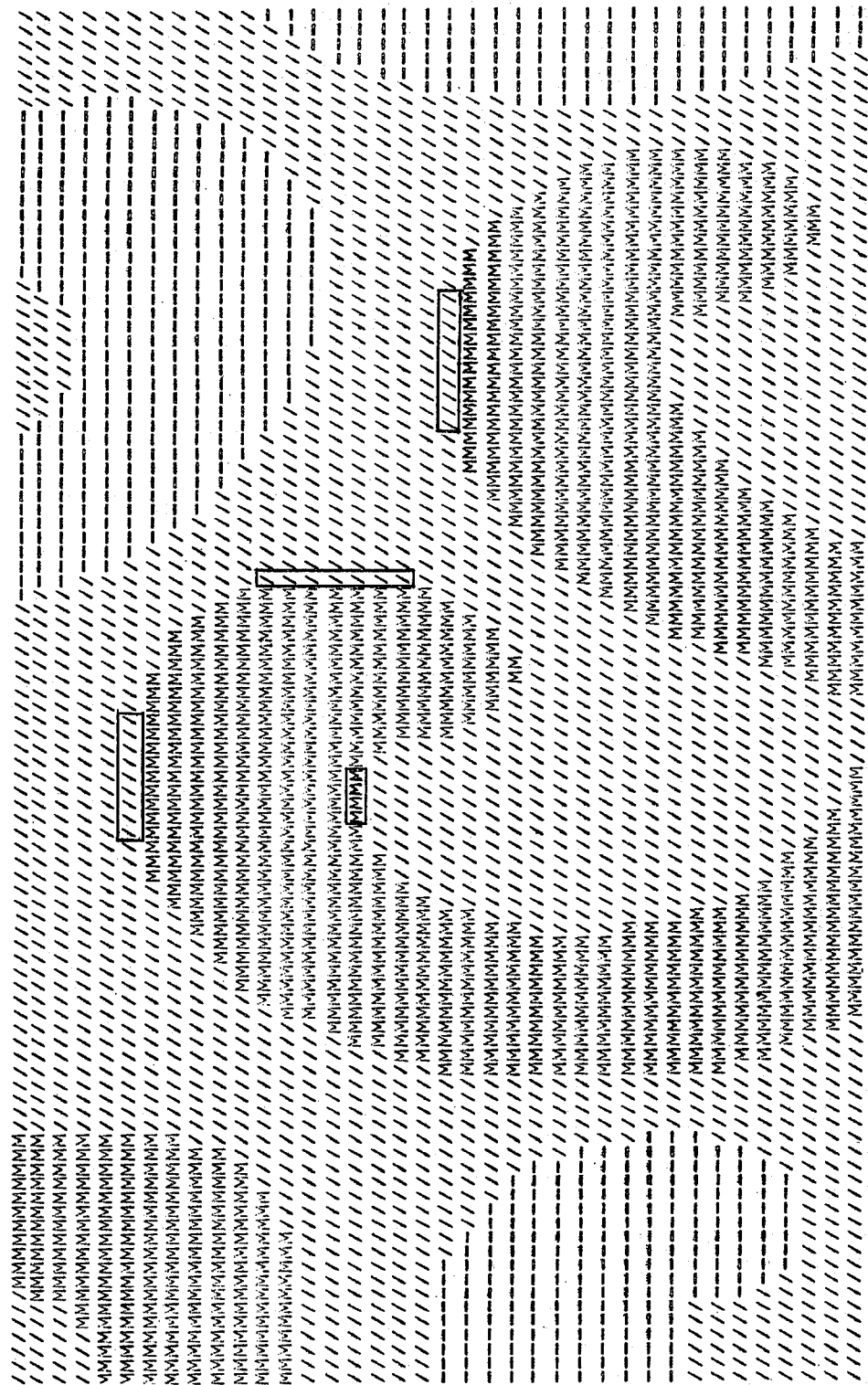
Figure 16C:
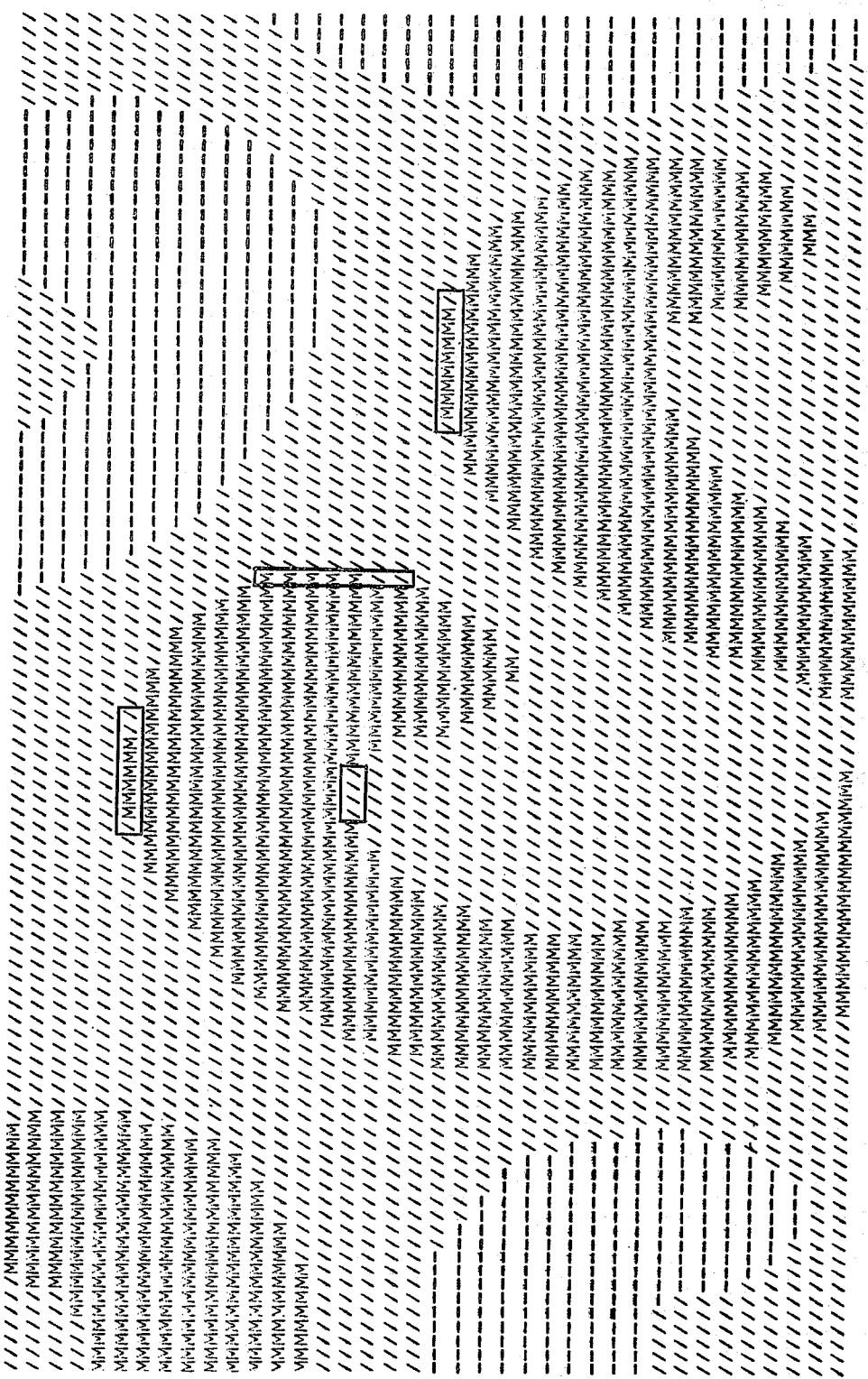

FIGS. 16a, b and c show the advantages of a correction matrix as shown in FIGS. 9a–9c. FIG. 16a shows a pattern with a great number of uncertain fields due to its design. FIG. 16b shows the pattern after its correction by the use of various matrixes. Particularly interesting is the conversion of the chains 176 to 179, marked in FIG. 16a. Since the starting and final fields of these chains are identical in color in each case, the correction is accomplished in the manner described in connection with FIG. 5b, which means that the areas 176 to 179 appear in the pattern shown by FIG. 16b in each case in the color which matches the color of the starting and final fields. This results in an unsightly flattening of the pattern, an occurrence which would not happen in case of a manual correction. However, if the matrix shown by FIGS. 9a–9c is being used, the uncertain fields of the chains 176, 178 and 179 will be reproduced only partially in the color "/", the color of the starting and final fields because the color "M" will be assigned to several of these fields because this color matches an adjacent block of the pattern. Chain 177 will be reproduced fully in the color "/", even though the starting as well as the final field have the color "M", in complete contrast to the application by matrix 46 (FIG. 5b). An inspection of the pattern depicted in FIG. 16c demonstrates that the correction is also satisfactory in aesthetic respect and comes very close to a correction when performed by a designer based on subjective criteria.

The invention is not limited to the practical examples described above, and can be modified in many ways. It can be proved by practical tests that the order of application of the various matrixes has no significant influence on the total number of items of uncertain information which can be eliminated. It will be advantageous however to apply first those matrixes which will accomplish the greatest number of corrections in a relatively short computer time because the computer times for the processing of the remaining matrixes is reduced in proportion to the number of the remaining uncertain fields. It appears to be a fact that the variable matrixes shown by FIGS. 5 to 7 account for the greatest number of corrections. In general, the computer time for the full processing operation will fluctuate up to 20% by changes in the order of the various matrixes.

So far, the tests have been carried out by use of U-matrices (FIG. 2), corner-matrixes (FIG. 4), variable matrixes (FIGS. 5 to 7) and finally with the, likewise variable, matrixes shown in FIG. 8. A correction by use of these matrixes can be followed by additional corrections, for example by simplifying the conditions for the matrixes according to FIGS. 5 to 7 in such manner that a chain length of only one single uncertain field is required, that one sole order of processing is specified, or that a determination of the color of the starting field is omitted. Finally it is possible to reduce substantially the computer time in case of the use of matrixes shown in FIG. 8 in such manner that after the elimination of a chain of uncertain fields the cyclic re-processing is not applied to the entire pattern so far corrected but is limited to one specific section, defined for example by a distance of five columns or lines respectively, counted from the starting and final fields of the corrected chain. This measure will permit a substantial reduction in the computer time in case of the pattern, described above and depicted by FIGS. 15a and b. Finally, another saving in computer time can be attained if the various matrixes are not applied in succession to the entire pattern, but in succession or even in parallel to that portion of the pattern which is present at one time in the working storage 120 (FIG. 10). The degree of efficiency of the method proposed by the invention is determined greatly by the type of the matrixes being used and by the type of the pattern to be processed. If the above described matrixes are used, it is usually possible to eliminate at least 90%, and often even 100% of all uncertain fields. Any remaining uncertain fields must be corrected manually in such manner that they are printed out together with the associated section of the pattern, or are made visible on a display screen, and it is feasible in the latter case to mark the uncertain fields by an intermittent light. Uncertain fields remaining after the automatic correction will primarily occur in areas where sections of the pattern with three or more colors join each other. If a manual correction is undesirable, such uncertain fields can be eliminated automatically in such manner that, for example, the uncertain information is replaced by any one of the applicable color codes, by a previously determined color information, or by that color information which occurs most frequently within the adjacent area. Finally, it is possible to replace such uncertain information by that color information which belongs to the largest coherent adjacent block.

The method of the invention can be modified further in that manner that the correction process will not be based on individual items of uncertain information which require a new search whenever the pattern is processed by means of another matrix, but that each uncertain information is picked out and then stored in tabular form prior to the processing by the various matrixes. The correction can then be carried out later on systematically by use of the tabulated uncertain information, with the uncertain information being erased from the tabulation upon its correction.

The invention is also not limited to the matrixes described above, these matrixes to be considered examples only. The matrixes described above are based on the assumption that an uninterrupted chain of uncertain fields will be present. However, since frequently chains will occur which are separated by one field with color information from another corresponding chain, it would be possible to use matrixes which allow the presence of fields with color information within specifically defined chains, an arrangement which would facilitate, for example, the elimination of chains running in chequered fashion. Finally, it is also possible, as already mentioned in connection with the flow chart of FIG. 13, to create matrixes by piecing together several individual matrix elements. FIG. 6 shows such piecing together of individual matrix elements in a fixed, established order, where one element of the matrix 62 consists of one uncertain field, one color field placed above and one color field placed below, while the elements of matrixes 63 to 66 consist each of one uncertain field, one color field placed at the right and one color field placed at the left, resulting in a uniform gradation. This gradation can be made variable, for example by the use of different matrix elements or identical elements arranged in different directions, if in case of the application of one specific element in a first direction the specified conditions are not met.

Finally, the invention is not limited to the stipulation that during the correction process only those eight fields are being considered which are directly adjacent to an uncertain or color field respectively. Especially in sections of the pattern where more than two color fields border each other, there could arise the necessity to consider fields which are not directly adjacent.

What is claimed is:

1. Method for the processing of information obtained from the scanning of a multicolored pattern, including scanning said pattern; obtaining individual information items by the scanning of pattern-fields, representing as color information items each clearly identifiable color and representing as uncertain information items each information obtained by the scanning of a pattern-field with a color not clearly identifiable; and processing each uncertain information item by at least one correction matrix by testing information items from fields near the field associated with the uncertain information item to determine whether certain conditions are met, and by replacing the uncertain information item, if such conditions are met, by a color information item as determined by the correction matrix.

2. Method according to claim 1, wherein the information items of a number of adjacent fields are tested by means of one correction matrix (14 to 17 and 40 to 43) for the presence of certain features, the number of the adjacent fields to be tested being definitely specified by the correction matrix.

3. Method according to claim 1, wherein the information items of a number adjacent fields are tested by means of one correction matrix (46, 62 to 66, 79, 84) for the presence of certain features, the number of the adjacent fields to be tested being variable and dependent on the scanned pattern.

4. Method according to claim 1, wherein the information items of adjacent fields are tested by means of one correction matrix (46, 62 to 66, 79, 84) for the presence of certain features, the order of the adjacent fields to be tested being variable and dependent on the scanned pattern.

5. Method according to claim 1, wherein the adjacent fields are tested by means of one correction matrix (14 to 17) to determine the presence of certain color features.

6. Method according to claim 1, wherein the adjacent fields are tested by means of the correction matrix (40 to 43, 46, 62 to 66, 79, 84) to determine the presence of uncertain information items.

7. Method according to claim 6, further comprising replacing the uncertain information items of adjacent fields by a color information item as specified by the correction matrix, when the features tested by the correction matrix (46, 62 to 66, 79, 84) are present.

8. Method according to claim 1, wherein the uncertain information items are processed simultaneously or successively by a plurality of different correction matrixes.

9. Method according to claim 1, and further comprising replacing the uncertain information items, when features specified by the correction matrix are present, by a color information item as determined by the correction matrix, and only when certain additional conditions are met.

10. Method according to claim 1, and further comprising processing the color information items prior to the processing of the uncertain information items, by erasing matrixes for examining information of fields, which are near the fields carrying the color information items, as to the presence of certain features, and replacing the color information item by an uncertain information item if such features are found to exist.

11. Method according to claim 10, wherein the erasing matrix for examining the informations of adjacent fields for the presence of certain features, specifically defines the number of fields to be examined.

12. Method according to claim 10, wherein the erasing matrix for examining the informations of adjacent fields for the presence of certain features, is varied according to the number of such adjacent fields to be examined.

13. Method according to claim 10, wherein the erasing matrix for examining the informations of adjacent fields for the presence of certain features, is varied according to the order in which such adjacent fields are to be examined.

14. Method according to claim 10, wherein the erasing matrixes and the correction matrixes are applied in succession to parts of the pattern.

15. Method according to claim 1, wherein during the processing of information, information items are assigned to fields at one side of the pattern, and also to fields located at the opposed side of the pattern.

16. Method according to claim 1, wherein the information items are processed repeatedly in a different order by the same matrixes.

17. Method according to claim 1, wherein the information items are processed repeatedly in a different order by different matrixes.

18. Method according to claim 1, wherein the process is repeated after modification of the operating parameters of the process.

19. Method according to claim 1, wherein the process is repeated after modification of additional conditions.

20. Apparatus for the processing of information items obtained from the scanning of a multicolored pattern, comprising a pattern storage in which are stored all information items obtained by the scanning of the pattern, such information items consisting of color information items and uncertain information items, said color information items being obtained from the scanning of points possessing a clearly identifiable color, and said uncertain information items from the scanning of points, the color of which can not be clearly identified; selecting and storage means (121,124) connected with the pattern storage (107) for selecting any uncertain information items and for storing the address of at least one uncertain information item found; at least one matrix processor (125) connected with the pattern storage (107) for the testing of information items assigned to fields adjacent to that field the address of which is stored in the address storage (124); and a correction circuit (127) connected with the matrix processor (125) and the pattern storage (107) for the conversion of the uncertain information items to a color information item at the address stored in said selecting and storage means, said matrix processor (125), upon conclusion of the testing operation, sending either a correction signal to the correction circuit to carry out the conversion, or an error signal to said selecting and storage means (121,124) to pick out another, new uncertain information item.

21. Apparatus according to claim 20, wherein said selecting and storage means (121,124) first determine and store the addresses of uncertain information items, and then applying the matrixes to the uncertain information items so determined.

22. Apparatus according to claim 20, wherein said matrix processor (125) comprises an address computer (130) which is programmed to compute the addresses assigned to adjacent fields; a matrix storage (133) for storing at least one color information item assigned to an adjacent field; and a color comparing unit (132) for comparing the information of the items determined by the address computer (13) with the color information present in the matrix storage (133) to emit either the correction signal or the error signal, depending on the comparison.

23. Apparatus according to claim 20, wherein the correction circuit (127) is designed to perform a test based on additional conditions prior to the correction.

24. Apparatus for the processing of information items obtained from the scanning of a multicolored pattern, comprising a pattern storage in which are stored all information items obtained by the scanning of the pattern; selecting and storage means (121,124) connected with said pattern storage (107) for picking out any color information item and for storing the address of at least one color information item found; at least one matrix processor connected with the pattern storage for the testing of information items assigned to fields adjacent to that field the address of which is stored in said selecting and storing means; and a correction circuit, connected with the matrix processor, for the conversion of a color information item to an uncertain information item, said uncertain information item being the code of a color which can not be clearly identified, said matrix processor (125), upon conclusion of the testing operation, sending either a correction signal to the correction circuit to carry out the conversion, or an error signal to said selecting and storage means (121,124) for selecting another, new color information item.

25. Apparatus according to claim 24, wherein said matrix processor (125) comprises an address computer (130) which is programmed to compute the addresses assigned to adjacent fields; a matrix storage (133) to store at least one color information item assigned to the field being processed; and a color comparing unit (132), which compares the information items at the addresses determined by the address computer (13) with the color information items present in the matrix storage (133) to emit either a correction signal or an error signal, depending on the result of the comparison.

* * * * *